(No Model.)  2 Sheets—Sheet 1.

A. E. CARTER.
COMBINATION CANISTER.

No. 586,758.  Patented July 20, 1897.

Witnesses
E. C. Wurdeman
S. S. Williamson

Inventor
Amos Edwin Carter
By Geo. H. Holgate
Attorney (No Model.) 2 Sheets—Sheet 2.

A. E. CARTER.
COMBINATION CANISTER.

No. 586,758. Patented July 20, 1897.

Witnesses
E. C. Wurdeman
S. S. Williamson

Inventor
Amos Edwin Carter
By Geo. H. Holgate
Attorney

THE NORRIS PETERS CO., PHOTO-LITHO., WASHINGTON, D. C.

UNITED STATES PATENT OFFICE.

AMOS EDWIN CARTER, OF TAYLOR, IOWA.

COMBINATION-CANISTER.

SPECIFICATION forming part of Letters Patent No. 586,758, dated July 20, 1897.

Application filed August 21, 1896. Serial No. 603,555. (No model.)

*To all whom it may concern:*

Be it known that I, AMOS EDWIN CARTER, a citizen of the United States, residing at Taylor, in the county of Pottawattamie and State of Iowa, have invented certain new and useful Improvements in Combination-Canisters, of which the following is a specification.

My invention relates to a new and useful improvement in combination-receptacles for holding coffee, tea, sugar, spices, all kinds of flour, corn, oats, wheat, and all kernels and the like, and has for its object to provide a device of this description by means of which the contents of a number of receptacles may be conveyed to a scale or other suitable locality without the necessity of opening said receptacles or having to use a scoop for this purpose.

With these ends in view my invention consists in the details of construction and combination of elements hereinafter set forth and then specifically designated by the claims.

In order that those skilled in the art to which this invention appertains may understand how to make and use the same, I will describe its construction and operation in detail, referring by letter to the accompanying drawings, forming a part of this specification, and in which—

Figure 1:
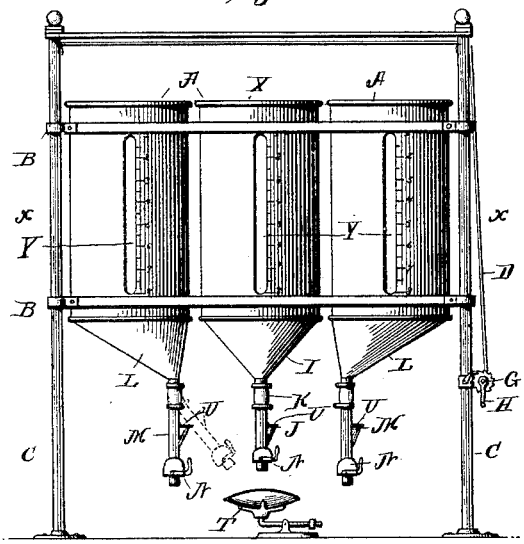
Figure 2:
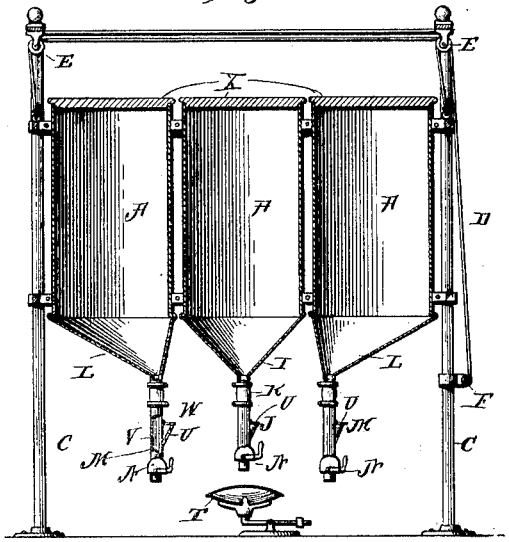
Figure 4:
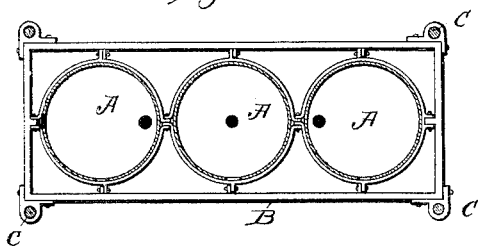
Figure 5:
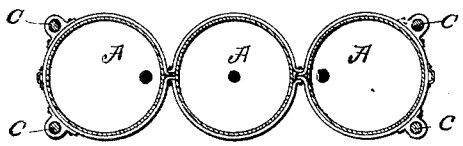
Figure 3:
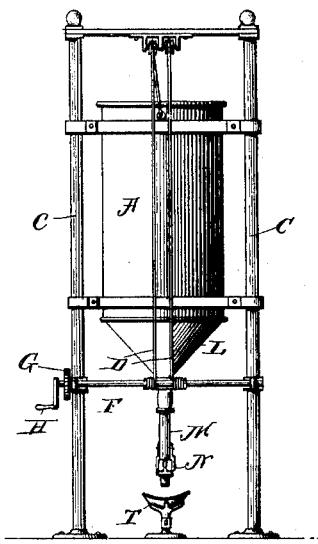
Figure 9:
Figure 6:
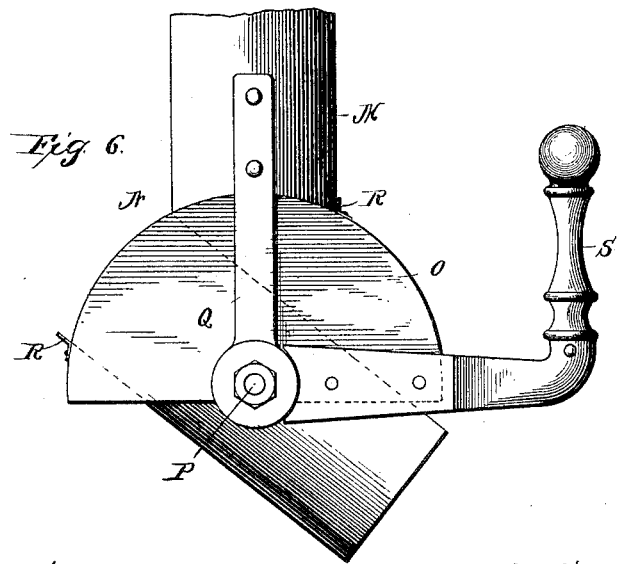
Figure 7:
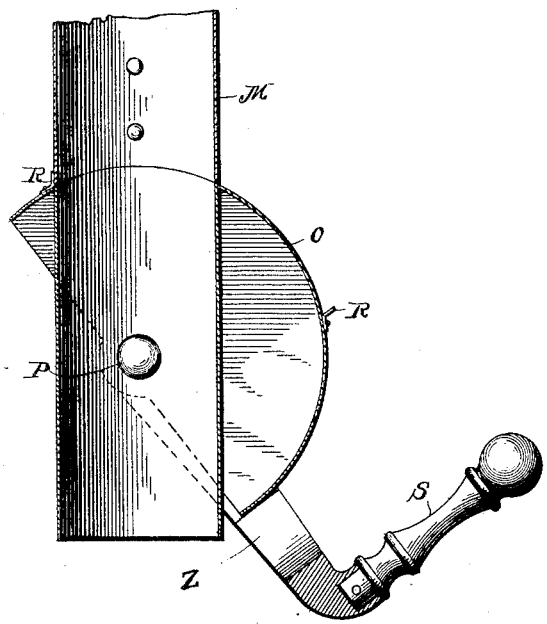

Figure 1 is a front view of three canisters arranged in accordance with my improvement; Fig. 2, a central section thereof; Fig. 3, an end elevation; Fig. 4, a section at the line $xx$ of Fig. 1; Fig. 5, a similar view with the frame omitted; Fig. 6, an enlarged view of the lower end of one of the spouts; Fig. 7, an enlarged section of the same, and Fig. 8 a similar view at right angle to Fig. 7. Fig. 9 is an enlarged sectional view of the supplemental return-hopper.

In carrying out my invention I arrange any desired number of canisters A within a frame B, which is adapted to slide upon the uprights C, secured to any suitable surface, such as a counter. A series of cords D and pulleys E are provided and so arranged as to raise and lower the canisters by means of a windlass F, which is provided with a ratchet-and-pawl mechanism G, by means of which the canisters may be held in their elevated position, and a crank H for the operation of the windlass. I have here shown three such canisters arranged within the frame, the center one of which has a funnel-shaped bottom I, to which is attached a spout J by means of a flexible section K, said flexible section being clamped to the bottom of the canister and to the spout by suitable bands. Each of the canisters which are arranged upon the sides of the center canister are also provided with sloping bottoms L, which are so shaped as to bring the openings in said bottoms nearer the sides of these canisters next the center canister, and each of the side canisters is provided with a spout M, similar in all respects to the spout J and connected to the bottom of the canisters in the same manner.

Figure 8:
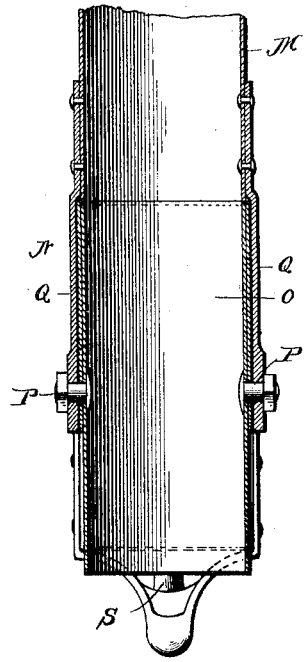

Upon the ends of each of the canisters is pivoted a valve N, composed of a semicircular hood and a tube O of the same internal diameter as the spout, and these valves are pivoted at P to straps Q, which depend from the spouts. Thus by turning the tubes O into alinement with the spouts, as shown in Figs. 7 and 8, the contents of the canisters will be permitted to flow downward through the spouts, but when the valves are so turned as to bring a portion of the semicircular hood immediately beneath the spout, as in Fig. 6, the opening in the latter will be closed, as will be readily understood.

In order that the movements of the valve may be limited, I provide the lugs R, one of which will strike against the side of the spout when the valve is turned in either direction. Each of the valves is provided with a handle S, by means of which it may be manipulated and which is attached to the yoke Z, secured to the hood O. From this it will be seen that when a pair of scales T is placed beneath the canisters a portion of the contents of either of the canisters may be conveyed to said scales by simply grasping the handle S of one of the valves, swinging the spout over the scales, and turning the valve, so as to permit the downflowing of the contents of the canister until the proper quantity thereof has been delivered to the scales, and should more of the contents of the canister than is necessary gain access to the scales the surplus may be returned to the spout by means of the hopper U, which is formed upon the side of each of the spouts and is provided with a valve V, adapted to close the passage between the hopper and the spout in one direction, but permit the passage of material from the hopper to the spout, and I prefer to close this hopper with a hinged cover W. The advantage of this arrangement is that in weighing out material any overweight may be turned to the spout, and this returned material will be the next fed from the spout when the latter is used again, so that after having once been exposed to the atmosphere the material will be quickly disposed of, which will prevent its deterioration upon the hands of the salesman.

The object in mounting the canisters so that they may be elevated is to give clear space upon a counter when the canisters are not needed for use and yet quickly bring them into proper relative position to the scales, which greatly facilitates the operations of selling.

The top of each of the canisters is closed by a cover X, which is made so close fitting as to exclude air and moisture from the canisters. Thus when the latter have been filled and closed by these tops the contents thereof will not deteriorate by atmospheric action, and for convenience in determining the amount of material in either of the canisters sight-gages Y are set in the front thereof, with suitable graduations, so that by casual observation the approximate amount of material is determined.

My improvement is especially adapted for use in vending coffee, tea, sugar, spices, flours, meats, corn, wheat, oats, and all kernels and the like, in that when two or more canisters are arranged as shown a like variety of said materials may be conveyed to the scales to make up a given weight, thus properly mixing several brands to produce a compound article, as is well understood.

In practice it has been found that coffee, tea, spices, and the like stored in canisters and delivered as here described gives much better satisfaction to the customer on account of the retention of the entire strength of the material.

It is obvious that any number of canisters may be arranged within a set, the only requirement being that they shall be so arranged as to be quickly brought into position and the spouts leading therefrom adapted to be brought in conjunction with the scales.

My device when made of sufficient size may be used to bag ground ores and the like, in which case the spout and valve may lead from any suitable receptacle.

Having thus fully described my invention, what I claim as new and useful is—

1. The combination of two or more canisters adapted to hold a quantity of material, a spout leading from each of said canisters having a hopper thereon, a flexible section arranged upon each of said spouts, and a cut-off valve adapted to control the passage through each of said spouts, as specified.

2. The combination of two or more canisters secured together within a frame, inclined bottoms formed upon said canisters, spouts having hoppers leading from said bottoms, flexible sections included in said spouts, valves arranged upon the lower ends of said spouts, and handles for operating said valve, as shown and described.

3. The combination of two or more canisters secured together in a frame, inclined bottoms carried by said canisters, flexible sections leading from said bottoms, spouts attached to said sections, valves carried by the lower ends of said spouts, hoppers connected with said spouts, and means for raising and lowering said canisters, substantially as and for the purpose set forth.

4. The herein-described combination of two or more canisters, a frame for securing said canisters together, uprights by which said frame is guided, cords and pulleys for supporting said frame, a windlass for raising and lowering said frame, inclined bottoms formed with the canisters, flexible sections leading from said bottoms, spouts attached to said sections, valves carried by the lower ends of the spouts whereby the passages in the latter are controlled, handles for operating said valves, and sight-gages for determining the amount of material in each of the canisters, substantially as and for the purpose set forth.

5. In combination with a series of canisters as described, spouts J connected to said canisters by flexible sections, semicircular valves pivoted to the lower ends of said spouts, tubes carried by said valves adapted to be turned into alinement with the spouts and out of alinement therewith, handles for operating said valves, hoppers connected with the spouts, valves for controlling communication between said hoppers and spouts, and covers for closing said hoppers, substantially as and for the purpose set forth.

In testimony whereof I have hereunto affixed my signature in the presence of two subscribing witnesses.

AMOS EDWIN CARTER.

Witnesses:
Z. P. HEDGES,
S. S. WILLIAMSON.